US010365057B2

(12) United States Patent
Black et al.

(10) Patent No.: US 10,365,057 B2
(45) Date of Patent: Jul. 30, 2019

(54) SMART GUN TECHNOLOGY

(71) Applicant: SAFEARMS LLC, Beavercreek, OH (US)

(72) Inventors: Terrell C. Black, Dayton, OH (US); Kevin S. Weaver, Kettering, OH (US); Ronald J. Miller, Sr., Beavercreek, OH (US); Arijit Sengupta, Beavercreek, OH (US); James A. Good, Centerville, OH (US)

(73) Assignee: Safearms LLC, Beavercreek, OH (US)

( * ) Notice: Subject to any disclaimer, the term of this patent is extended or adjusted under 35 U.S.C. 154(b) by 115 days.

(21) Appl. No.: 15/206,576

(22) Filed: Jul. 11, 2016

(65) Prior Publication Data

US 2017/0010062 A1    Jan. 12, 2017

Related U.S. Application Data

(60) Provisional application No. 62/235,050, filed on Sep. 30, 2015, provisional application No. 62/190,518, filed on Jul. 9, 2015.

(51) Int. Cl.
F41A 17/00   (2006.01)
F41A 17/06   (2006.01)
(Continued)

(52) U.S. Cl.
CPC .......... F41A 17/063 (2013.01); F41A 17/066 (2013.01); F41J 5/10 (2013.01);
(Continued)

(58) Field of Classification Search
CPC ....... F42A 17/06; F42A 17/063; F42A 17/066
See application file for complete search history.

(56) References Cited

U.S. PATENT DOCUMENTS 4,682,435 A    7/1987 Heltzel
5,459,957 A    10/1995 Niner
(Continued)

OTHER PUBLICATIONS

Technology & Innovators, Gun Technology, <http://smarttechfoundation.org/technology-innovators/#innovators>, printed Nov. 15, 2016 (16 pages).
(Continued)

Primary Examiner — J. Woodrow Eldred
(74) Attorney, Agent, or Firm — Wood Herron & Evans LLP

(57) ABSTRACT

Systems and methods to use, monitor, and control a firearm technology including smart components embedded into a portion of the firearm and communicatively coupled to the firearm, are disclosed. Use of such smart components may permit the firearm to display and/or send alerts regarding status updates (such as power levels of a battery, indication of need of maintenance, or status of enablement or disablement). Further, use of such smart components may permit the firearm to recognize authorized users to permit one or more firearm operations, to be tracked via inventory control tags, to communicate with remote devices such as a cell phone, to charge an internal power supply, to prevent unauthorized tampering of the device, to enable voice control operations, and/or to inject a destructive solution into the firearm based on unauthorized use, wherein the solution may permanently destroy the firearm functionality.

19 Claims, 8 Drawing Sheets

(51) Int. Cl.
  *G01S 19/14*     (2010.01)
  *H04N 5/247*     (2006.01)
  *G01S 5/00*      (2006.01)
  *F41J 5/10*      (2006.01)
  *G06F 21/35*     (2013.01)

(52) U.S. Cl.
  CPC ............ *G01S 5/0027* (2013.01); *G01S 19/14* (2013.01); *G06F 21/35* (2013.01); *H04N 5/247* (2013.01)

(56) References Cited

U.S. PATENT DOCUMENTS

| | | |
|---|---|---|
| 5,461,812 A | 10/1995 | Bennett |
| 5,675,925 A * | 10/1997 | Wurger ................ F41A 17/06 42/70.06 |
| 5,937,557 A | 8/1999 | Bowker et al. |
| 5,953,844 A | 9/1999 | Harling et al. |
| 6,223,461 B1 | 5/2001 | Mardirossian |
| 6,237,271 B1 | 5/2001 | Kaminski |
| 6,301,815 B1 | 10/2001 | Sliwa |
| 6,343,429 B1 | 2/2002 | Mossberg et al. |
| 6,412,207 B1 | 7/2002 | Crye et al. |
| 6,415,542 B1 | 7/2002 | Bates et al. |
| 6,438,887 B1 | 8/2002 | Martin |
| 6,477,801 B1 | 11/2002 | D'dwyer |
| 6,533,149 B2 | 3/2003 | Vor Keller et al. |
| 6,563,940 B2 | 5/2003 | Recce |
| 6,823,621 B2 | 11/2004 | Gotfried |
| 6,856,238 B2 | 2/2005 | Wootton et al. |
| 6,861,944 B1 | 3/2005 | Hoepelman |
| 7,168,198 B2 | 1/2007 | Newkirk et al. |
| 7,200,965 B2 | 4/2007 | Vor Keller et al. |
| 7,353,632 B2 | 4/2008 | Newkirk et al. |
| 7,389,604 B2 | 6/2008 | Newkirk et al. |
| 7,600,339 B2 | 10/2009 | Schumacher et al. |
| 7,802,392 B2 | 9/2010 | Peterson et al. |
| 7,886,471 B2 | 2/2011 | Glock |
| 7,921,588 B2 | 4/2011 | Brown et al. |
| 2001/0032407 A1 | 10/2001 | Cain et al. |
| 2002/0112390 A1 | 8/2002 | Harling et al. |
| 2003/0070343 A1 | 4/2003 | Glock |
| 2005/0257411 A1 | 11/2005 | Wootton et al. |
| 2005/0262751 A1 | 12/2005 | Leslie |
| 2006/0042142 A1 | 3/2006 | Sinha |
| 2006/0208857 A1 | 9/2006 | Wong |
| 2007/0124979 A1 | 6/2007 | Newkirk et al. |
| 2007/0277420 A1 | 12/2007 | Newkirk et al. |
| 2009/0007476 A1 | 1/2009 | Mauch et al. |
| 2009/0037374 A1 | 2/2009 | Delia et al. |
| 2009/0064557 A1 | 3/2009 | Hughes et al. |
| 2009/0255160 A1 | 10/2009 | Summers |
| 2010/0281725 A1 | 11/2010 | Arbouw |
| 2011/0056108 A1 | 3/2011 | McCord et al. |
| 2011/0067282 A1 | 3/2011 | August et al. |
| 2011/0113664 A1 | 5/2011 | Delgado Acarreta |
| 2011/0119979 A1 | 5/2011 | Gussalli Beretta et al. |
| 2011/0162514 A1 | 7/2011 | Osborne et al. |
| 2017/0160041 A1* | 6/2017 | Stewart ................ F41A 35/00 |

OTHER PUBLICATIONS

Daniel Terdiman, Can smart guns slash gun violence? Silicon Valley says yes, Jan. 28, 2014 (3 pages).
Personalization Technologies (2 pages).
Laurie Segall, Gun safety advocates develop smart weapons, @CNNTech, Jan. 29, 2015 (1 page).
Ron Miller, et al., Interactive Control Solutions, White Paper as Submission to the Smart Tech for Firearms Challenge and Margot Hirsch, Smart Tech Challenges Foundation, email regarding Firearms Challenge Notification, Jun. 20, 2014 (2 pages).
The Yardarm Sensor (3 pages).

* cited by examiner

SMART GUN TECHNOLOGY

CROSS REFERENCE TO RELATED APPLICATIONS

Pursuant to 37 C.F.R. § 1.78(a)(4), this application claims the benefit of and priority to prior filed Provisional Application Ser. No. 62/190,518 filed Jul. 9, 2015, and prior filed Provisional Application Ser. No. 62/235,050 filed Sep. 30, 2015, both of which are expressly incorporated herein by reference.

TECHNICAL FIELD

This disclosure generally relates to systems and methods of use for firearms and, more specifically, to systems and methods of use for smart firearm or smart gun technologies.

BACKGROUND

Firearm or gun technology includes many different types of firearms, including automatic and semi-automatic weapons, handguns, shotguns, rifles, etc. Conventional mechanical mechanisms to provide safety to such firearms may include, for example, trigger guards to protect against accidental use of a trigger that would otherwise initiate firing of the firearm. Other mechanisms may also be used to enhance firearm safety A need still exists for other alternative systems and methods to assist with firearm safety and the safe use of firearm or gun technologies.

SUMMARY

According to an embodiment, a firearm comprising a smart technology system that controls one or more firearm functionalities is disclosed. The smart technology system includes one or more input/output (I/O) devices, a lock device, a processor, and a non-transitory computer readable storage medium having computer program instructions stored thereon. The computer program instructions, when executed by the processor, cause the processor to perform several operations. In a first operation, the computer program instructions cause the processor to engage the lock device by default, thereby disabling mechanical components of the firearm that are required to discharge or fire the firearm. As such, the firearm cannot be discharged or fired in the locked state.

In a second operation, the computer program instructions cause the processor to receive an input signal from an IO device, the signal encoding information regarding the identity of a user attempting to use the firearm. In a further operation, the computer program instructions cause the processor to determine, from the input signal, whether the user is an authorized user. When the user is determined to be an authorized user, the computer program instructions cause the processor to disengage the lock device to enable the mechanical components of the firearm that are required to discharge or fire the firearm.

According to a further embodiment, a processor based method of controlling a firearm comprising a smart technology system is disclosed. In a first stage, the method includes engaging, by a processor, a lock device that disables mechanical components of the firearm that are required to discharge or fire the firearm. In a second stage, the method includes receiving, by the processor, an input signal from an I/O device, the signal encoding information regarding the identity of a user attempting to use the firearm. In a further stage, the method includes determining, from the input signal, whether the user is an authorized user. In a further stage, when the user is determined to be an authorized user, the method includes disengaging the lock device to enable the mechanical components of the firearm that are required to discharge or fire the firearm.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals.

DETAILED DESCRIPTION

According to one embodiment of the invention, a firearm technology includes smart components embedded into a portion of the firearm, such as a grip portion, that are communicatively coupled to components that are remote to the firearm to effect a smart technology usage. The term "smart" as used herein refers to use of technologies incorporating various communicatively coupled components to electronically communicate between a firearm and such remote devices and automatically control one or more firearm functionalities, whether internally or from such remote components. For example, use of such smart components may permit the firearm to display and/or send alerts regarding status updates (such as power levels of a battery, indication of need of maintenance, or status of enablement or disablement).

Further, use of such smart components, in accordance with the invention, may permit the firearm to recognize authorized users to permit one or more firearm operations. The invention may also allow the firearm to be tracked via inventory control tags, to communicate with remote devices such as a cell phone, or to charge an internal power supply. The invention may prevent unauthorized tampering of the device, or enable voice control operations. Still further, the invention may be used to inject a destructive solution into the firearm, based on unauthorized use, to permanently destroy the firearm functionality. Various embodiments of the smart firearm technology and the operation of the smart firearm technology are described in more detail below.

Figure 1:
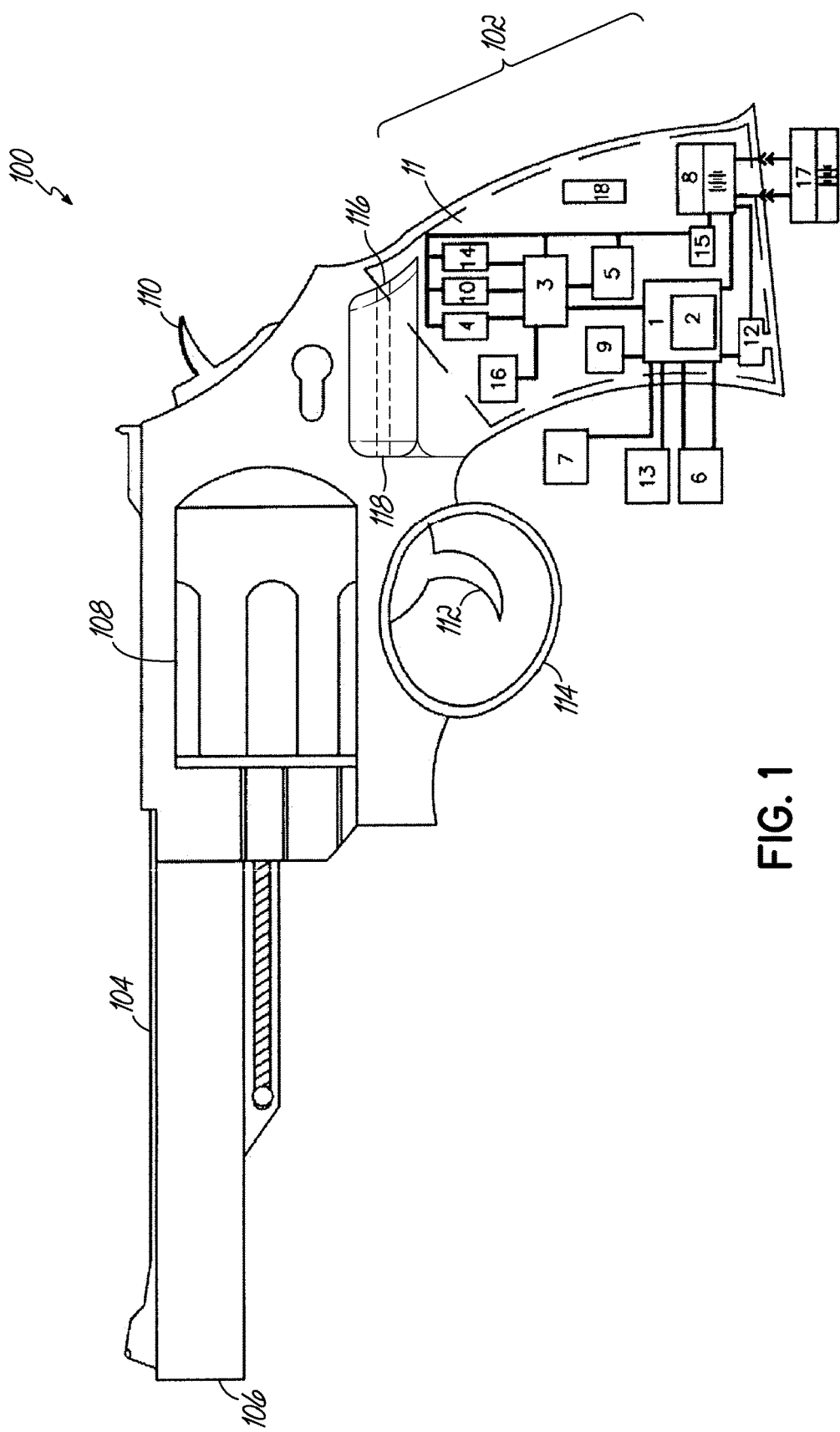
FIG. 1 depicts an exemplary firearm, according to an embodiment.

Referring to FIG. 1, an exemplary firearm 100 such as a handgun includes a grip portion 102, a barrel 104 ending in a muzzle 106 through which a bullet may exit, and a cylinder 108 that may hold one or more such bullets in separate chambers and that rotates to align those chambers with the barrel 104 as a firearm 100 is being prepared to shoot a bullet. The firearm 100 further includes a hammer 110 that acts to strike an internal firing pin or cartridge primer directly to detonate the primer to discharge the firearm. A trigger 112 acts as a lever that, when pulled, initiates a firing process to propel the bullet through the barrel 104 and the muzzle 106. For example, a trigger guard 114 may wrap around the trigger 112 to secure the trigger from accidentally being engaged. According to an embodiment, the firearm 100 may further include a rearward facing camera 116 and a forward facing camera 118, as described in further detail below. While the firearm 100 is illustrated as a handgun or revolver in FIG. 1, other types of firearms, such as semi-automatic and automatic guns, are within the scope of this disclosure, an so the illustrated example is not limiting to the invention.

Figure 2:
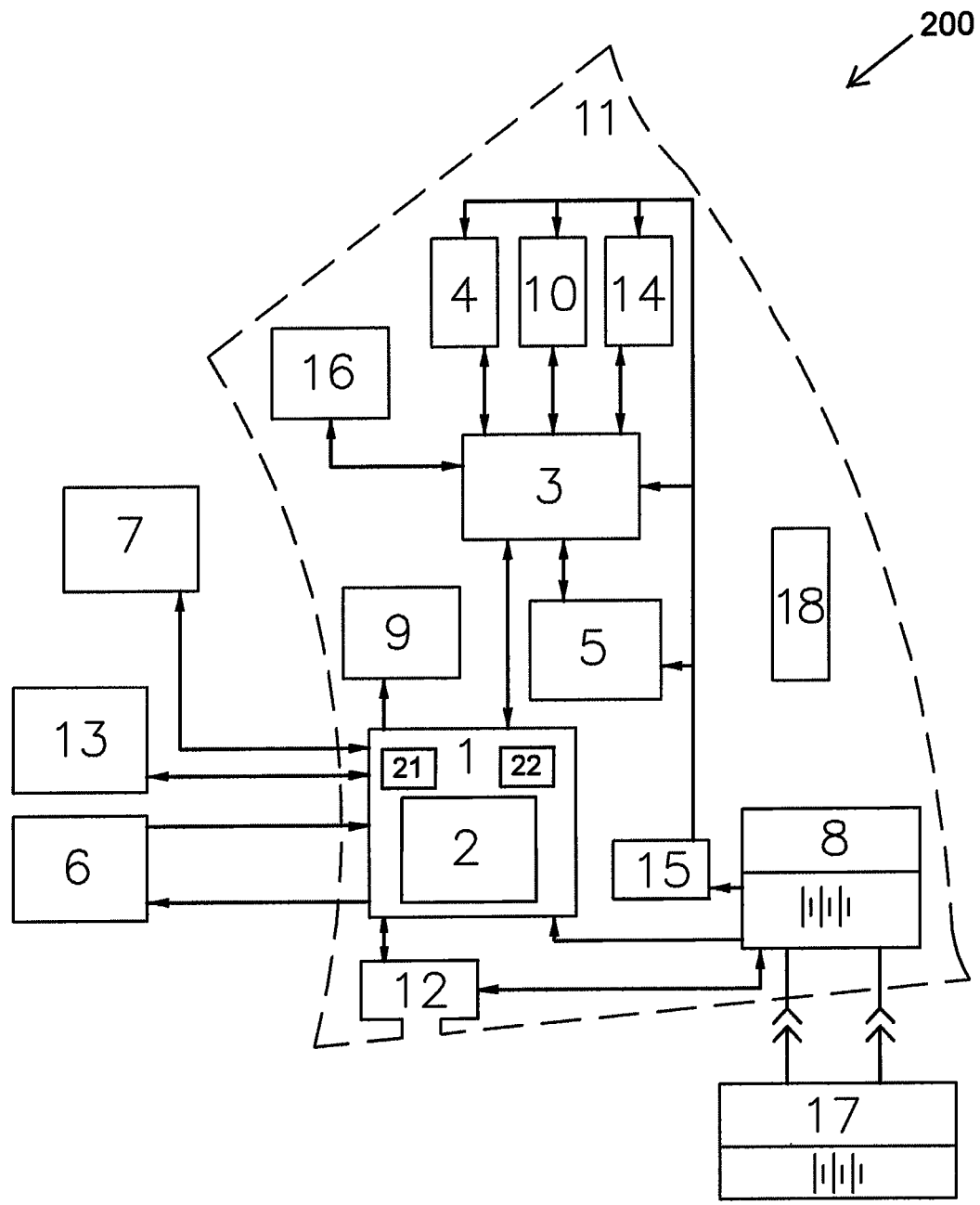
FIG. 2 depicts an exploded view of a grip portion of the exemplary firearm of FIG. 1 and a system for implementing a computer and software based method to monitor and/or control the firearm and its components embedded in the grip portion, according to an embodiment.

Referring to FIG. 2, the grip portion 102 is shown in an exploded view to show a smart technology system 200 having multiple components embedded within the grip portion 102 of the firearm 100. The various components of the smart technology system 200 as discussed herein are located in the firearm. While the smart technology system 200 is shown as primarily embedded within the grip portion 102, it should be understood that embedding some portions of the smart technology system 200 within other portions of the firearm 100 is within the scope of this disclosure.

The smart technology system 200 includes elements and components that are both embedded in the grip portion 102 or some other portion and components communicatively coupled to the embedded components and that may be remotely positioned from the embedded components of the grip portion 102. According to an embodiment, the smart technology system 200 includes a microcontroller 1 including a board 3 having build-in sensors, camera, and feedback devices, for example.

According to an embodiment, the microcontroller 1 (also referred to as a "processor") may include an Advanced Reduced Instruction Set ("RISC") Machines ("ARM"), or ARM-based, central processing unit ("CPU") capable of running Android 4.4 or later technologies. The microcontroller 1 (i.e., the "processor") may include a global positioning system ("GPS") or the functionality to interface with a separate GPS system or GPS system components. In a further embodiment, the smart technology system 200 may include a haptic device that may provide user feedback through a vibration actuator that generates vibrations. In a further embodiment, the smart technology system 200 may include a speaker to provide audio feedback, and a microphone to receive audio input.

In a further embodiment, the smart technology system 200 may include an accelerometer that is configured to measure motion of the firearm. The accelerometer may make measurements along three separate axes of motion. In further embodiments, the accelerometer may include functionality to measure motion along six axes.

According to an embodiment, the microcontroller 1 may be configured to interface with and to control a general packet radio services ("GPRS")-based communication device that is configured to provide text, talk, and/or data services. The microcontroller 1 may be configured to interface with and to further control a Bluetooth 4.0 Low Energy system ("BLE") that is configured to wirelessly send and receive information via wireless signals. Additional functionality may include a general purpose input-output ("GPIO") device, such as a generic pin on an integrated circuit ("IC"). Alternatively, the I/O device may be substituted by another I/O interface component such as an I/O board 3 as shown in FIG. 2. A camera (e.g., see 116 and 118 of FIG. 1) may also be part of the system 200 and be used to capture activities and environment conditions during activation and live fire of the firearm 100. According to an embodiment, the system may include standard camera sensors, 116 and 118, capable of recording SD-quality videos (Standard-Definition) and at least 2 MegaPixel images. Cameras may be augmented in actual implementation with infrared lighting capabilities for low-light applications. They can be USB or Wireless versions. According to an embodiment, the cameras may be directly wired to camera ports on the I/O board 3.

A non-transitory computer-readable memory 21 may be configured as a nonvolatile computer readable medium that is operationally coupled with the microcontroller and may include a random access memory (including SRAM, DRAM, and other types), flash memory, registers, disks, and/or other types of storage components. Additionally, the memory 21 may be configured to store, among other things, computer readable instructions, one or more look-up tables, and any data necessary to monitor and/or control the functionalities of the firearm 100. The microcontroller 1 may function as a processor configured to execute instructions stored on the memory 21. Additionally or alternatively, the one or more look-up tables and other data may be stored in a database 22 communicatively coupled to the memory 21. The memory 21 and database 22 may be separate components or may be integrated as part of microcontroller 1. The lines and schematic orientations depicted in FIG. 2, such as between the microcontroller 1 and other embedded and non-embedded components of the smart technology system 200 indicate or are illustrative of operative connections and paths of communications, as would be understood by persons of ordinary skill in the art, rather than physical connections between various components.

According to an embodiment, and as described in greater detail below, embedded components of the smart technology system 200 may include an application 2, an I/O board 3, and an electro-mechanical locking ("LOCK") device 4. The system may further comprise a near-field communication ("NFC") reading device 5 and a main power supply ("MPS") 8. The MPS may comprise a battery, according to an embodiment. The system may further comprise a light-emitting diode ("LED") 9 that is configured to provide visual feedback to a user. For example, the LED may be illuminated in a first color to indicate the firearm is in a first mode. Similarly, the LED may be illuminated in a second color to indicate the firearm is in a second mode, etc. That is, various colors may indicate various corresponding modes.

According to an embodiment, the system may comprise a capsule injector 10 that is configured to release a destructive solution rendering the firearm 100 permanently dysfunctional, as described in further detail below. The system may further comprise a micro Universal Serial Bus ("USB") plug 12. According to an embodiment, the USB plug 12 may be configured to send and receive data signals. The USB plug 12 may be further configured to receive electrical power from an external source and to transmit the received power to the MPS, as described in greater detail below. According to an embodiment, the system may further comprise a maintenance latching device 14 and a power switch 15. The system may further comprise a tamper detection switch 16 and an inventory control tag 18.

According to an embodiment, and as is described in greater detail below, non-embedded components of the smart technology system 200 include an external application and/or messaging system for remote ("RMT") control and monitoring of the firearm 100 such as an RMT device 6. The system may further comprise an external active tag for secondary activate such as a Bluetooth Technology ("BTT") tag 7. According to an embodiment, the system may comprise a primary radio frequency identification ("RFID") tag 13 that is associated with NFC reading device 5. The system may further comprise an auxiliary battery 17. A security enclosure or cover 11 may be used to conceal and secure the area of grip portion 102 of the firearm 100 that includes the embedded components of the smart technology system 200.

The control application 2 for controlling the system 200 is embedded and runs as a primary service on the microcontroller 1. The application 2 controls the functionality of the components of the smart technology system 200 as described below. According to an embodiment, application 2 may be implemented using hardware, software, firmware, tangible computer readable media having instructions stored thereon, or a combination thereof and may be implemented in one or more computer systems or other processing system, as described in greater detail below, such as with respect to FIG. 10.

The I/O board 3, as I/O hardware, is an internal supplemental input/output ("I/O") interface board that is capable of handling GPIO, including serial transistor-transistor logic ("TTL"), standard TTL-based digital inputs and outputs, and pulse-width-modulation ("PWM") outputs. A number of available input and output pins depend on necessary features that are implemented in the system and the actual component used for the I/O interface. The I/O hardware 3 may include any hardware and/or software for sending and receiving data to an external device, such as an output signal corresponding to authentication of a user in close proximity (e.g., an RFID tag) as described in greater detail below. Exemplary I/O hardware for the I/O interface includes, but is not limited to, USB, FireWire, Thunderbolt, local area network ("LAN") port, wireless fidelity ("Wi-Fi") card, Imax card, and/or other hardware for communicating with other networks and/or external devices.

The LOCK device 4 and lock feature of the invention is capable of securely blocking the internal trigger and hammer operation that will prevent the trigger 112 from being pulled to discharge the firearm. For example, the firearm 100 may be defaulted to a disabled, locked state in which the firearm 100 is not functional to fire. The LOCK device 4 prohibits functionality of the firearm 100 by disabling the mechanical components of the firearm 100 that are required to discharge or fire the firearm 100. That is, if the trigger is pulled, the gun will not fire. When the firearm 100 is in an enabled, unlocked state, the LOCK device 4 is disengaged and the firearm 100 is in a non-default position (or "ready" position) and has the functionality to discharge or fire a bullet, for example. The system 200 allows the system or firearm to be moved selectively between an enabled and a disabled status.

According to an embodiment, the RMT device 6 controls and/or monitors the firearm 100 through a protocol designed to remotely send and receive messages to and from the microcontroller 1. A two-way messaging protocol may be sent over a Short Messaging System ("SMS") or a user-friendly interface such as a graphical user interface ("GUI"). According to an embodiment, the SMS functionality GUI may be run and/or displayed on a remote device such as on a smart cellular phone or other smart device.

The MPS 8 may provide power to various of the components of the smart technology system 200 such as the I/O board 3, locking mechanisms such as LOCK device 4, and internal tag readers such as the NFC reading device 5. The power switch 15 may be an externally accessible power switch usable to turn OFF the power to the I/O interface or board 3 to save battery life. The microcontroller 1 may continue to run using power from a secondary power source, such as an auxiliary battery to continue monitoring the firearm 100 when the power switch 15 is engaged turning OFF power to the I/O board 3. The auxiliary battery 17 may be a generally small external battery that is configured to snap into a corresponding battery port of the firearm 100, or otherwise integrate with the firearm, to provide an alternate source of power when the firearm 100 is in or has a low battery condition or status.

The USB port 12 may include a male connector port that links to a female connector port or opening of the firearm 100 and/or a peripheral device having a mating female port or plug portion. The USB port 12 may be used to upload and/or download information and data to and from the processor and onboard database 22 or other memory components of the firearm 100. The USB port 12 may also be used to recharge a battery onboard the firearm 100. The batteries or other elements for MPS 8 may be recharged by use of the USB port 12 that may include a first and second male plug portions at opposite ends. The first male plug portion may include a 120 volt plug (connected to by another USB male connector port end, for example) that may be inserted into a standard outlet, for example, and the second male plug portion may be a male connector port that is shaped and configured to be received in the female connector port of the firearm 100.

According to an embodiment, a firearm may further include a first wireless battery charging device that charges the battery when the first wireless battery charging device communicates with a corresponding external second wireless battery charging device. In this regard, the internal battery 8 acts as the main power supply (MPS) for the system. The system may further include an auxiliary battery 17 that snaps into a receiver on the firearm to act as an alternate power source when the MPS battery power level runs low. Besides being rechargable via the USB interface, both the MPS 8 and the external auxiliary battery may be Qi compatible and therefore may be be recharged wirelessly when laid on a charging pad similar to what is used with a cell phone.

According to an embodiment, information and data may be uploaded to and from a memory within the firearm 100 by inserting the male connector port of the USB plug 12 into the female connector port of the firearm 100 and connecting another male connector port of an opposite end of the USB plug 12 into a peripheral device such as a computer or mobile device. Data may also be retrieved from the firearm 100 via a cellular network associated with the RMT device 6 and using the remote application if the RMT device 6 has a valid cellular signal and is connected to an authorized cellular network, for example. According to an embodiment, the RMT may be implemented as an external device that sends commands to the firearm and receives data and information from the firearm. The RMT is capable of running an operating system such as Android 4.4, or higher, and may utilize a unique application to remotely control the functionality of the firearm. According to an embodiment, the RMT may be configured to function like a smart phone that runs a software application that allows the user to configure how the system operates to the user's preference via a GUI or other method. The RMT may send commands to the firearm via text messaging using cellar communication.

The NFC reading device 5 may be incorporated into the grip portion 102 of the firearm 100 to read tags for authentication, such as to read one or more RFID tags 13. According to an embodiment, the RFID tags 13 are electronic labels that include an antenna, an integrated circuit ("IC") chip that has a memory including a unique identification number, and a substrate that holds the tag components together. The RFID tag 13 may be external to the firearm 100 and may be used to identify an "authorized individual" such as an individual who is authorized to access and use the firearm 100. According to an embodiment, the RFID tag 13 may be a high frequency ("HF") tag using a 13.56 MHz NFC protocol. The unique identification of the RFID tag 13 may be assigned to an authorized individual, and the unique identification may be stored on the onboard database 22 to create a valid RFID tag 13. A valid RFID tag 13 may allow for customizable full control or partial control over the functionality and usage of the firearm 100.

According to an embodiment, and in operation, when the RFID tag 13 passes within a close proximity of the firearm 100, the NFC reading device 5 senses the presence of the RFID tag 13 and establishes communication between the NFC reading device 5 and the RFID tag 13. The NFC reading device 5 reads the unique identification encoded within the RFID tag 13 and sends this information to the microcontroller 1 for authentication. The microcontroller 1 authenticates the RFID tag 13 by comparing its unique identity to one or more authorized identities included in the onboard database 22 to determine if the RFID tag is valid. Once the microcontroller 1 authenticates the RFID tag 13 as valid, the microcontroller grants authorization for the functionality of the firearm 100 to be unlocked and enabled by sending a signal to the LOCK device 4 that unlocks and enables the firing mechanism of the firearm 100 and simultaneously activates the LED 9 to glow a green color, for example, to reflect a firing enabled status of the firearm 100.

If the microcontroller 1 does not authenticate the RFID tag 13 as valid and rather determined it to be invalid, the LOCK device 4 will remain in a disabled, locked position and the firearm 100 will not be functional. In this disabled, locked position, the LED 9 may glow a red color, for example, to reflect the firing disabled status of the firearm 100. According to an embodiment, the application that runs in the RMT as well as the application that runs in the firearm both have the capability to receive and act on voice instructions verbalized by an authorized user. The system in the firearm and the RMT each utilize voice biometrics for this purpose that authenticates that the user who is verbalizing the instruction is indeed the authorized user of the firearm. If the system in the firearm or the RMT authenticates the user's voice as the authorized user then the system executes the command that was verbally communicated. According to an embodiment, the user can verbally communicate instructions directly to the firearm or the user can verbally communicate instructions through the RMT. The verbal instructions, among other things, are used to change the state, or mode, that the firearm is in such as "Home," "Away," "Ready," "Maintenance," and "Destruct."

According to an embodiment, a firearm may further include a first camera 116 pointing in a backward direction that captures images of a person holding the firearm and a second camera 118 pointing in a forward direction that captures images of objects in a direction in which the firearm is pointed (e.g., see FIG. 1). In a further embodiment, the first and second cameras, 116 and 118, may be configured to transmit images wirelessly to an external network or device. According to an embodiment, a firearm may further include a laser sight that assists a user in aiming the firearm at an intended target. According to an embodiment, the laser sight may be configured to be activated only by an authorized user. Therefore, the laser sight might be controlled along with the firing mechanism of the gun.

According to an embodiment, electrical components and mechanical parts of the firearm 100 may require maintenance, and certain of those components and parts may be embedded in the grip portion 102 and secured by the cover 11 that acts as a security enclosure and that may require authorization to be accessed. The RFID tag 13 may be coded to permit such access to the secure area of the grip portion 102 that is covered by cover 11 to permit such service and repair. As described above, the microcontroller 1 may authenticate the RFID tag 13 by comparing its unique identity to one or more authorized identities included in the onboard database 22 to determine if the RFID tag is valid and is permitted to access the area secured by cover 11 to service and repair the firearm 100.

Once the microcontroller 1 authenticates the presence of a valid RFID tag 13 for such service and repair, as described above, the microcontroller 1 sends power from MPS 8 to the maintenance latching device 14 to open cover 11 and permit access to the secure area of the grip portion 102 that includes the embedded components of the smart technology system 200. The maintenance latching device 14 may be an electromechanical latch that may be activated by a remote protocol command or a specifically encoded RFID tag, as discussed above. Activation of the maintenance latching device 14 may allow the firearm 100 to be disassembled for maintenance purposes, for example. The maintenance latching device 14 may further simultaneously power the LED 9 to glow a blue color to indicate maintenance activation and that an authorization was granted to access the secure area under the cover 11.

To provide access to this secure area upon such authorization, the maintenance latching device 14 may retract a locking pin that passes through a bottom portion of the cover 11 and into a locking tab attached to an inside area of the cover 11. After the locking pin is retracted, the cover 11 may be removed to gain access to the electrical and mechanical components of the grip portion 102 for service and repair. If the RFID tag 13 is read as invalid for such permissions, access to the secure area under the cover 11 is denied and the area will remain secured. In the event of a forced entry attempting to open the cover 11 to access the underlying secured area, the tamper detection switch 16 may send a notification to the microcontroller 1, which may send alerts to one or more authorized users of the unauthorized entry and attempted access condition. For example, the tamper detection switch 16 may be an internal tamper micro switch that is used to send one or more alarm messages via the microcontroller 1 and the RMT device 6 to a user (such as by sending a text message, for example) when an unauthorized attempt is made to disassemble the firearm 100.

The BTT tag 7 may be a subordinate or supplementary secondary safety activation device such that, if enabled, the firearm 100 unlocks only when in close proximity of the BTT tag 7. The BTT tag 7 may be a Bluetooth Low Energy ("BLE") tag that may be button shaped with a build-in coin cell battery using a BLE protocol. According to an embodiment, an inventory control tag 18 may be an Ultra High Frequency ("UHF") RFID tag that operates in a range of from about 860 MHz to about 960 MHz, for example, to identify the firearm 100 for inventory control and/or other administrative purposes. The UHF tag prevents interference with the HF NFC reading device 5 and extends an inventory read range.

According to an embodiment, the LED 9 may include one or more semiconductor diodes that glow when a voltage is applied and used to indicate a functional state or status of the firearm 100. For example, a low battery condition of the firearm 100 may be assigned a color such as yellow, and the LED 9 may glow yellow when the firearm 100 has a low battery condition. As other examples and not limitations, the LED 9 may glow red when the firearm 100 has been disabled, the LED 9 may glow green when the firearm 100 has been enabled, and/or the LED 9 may glow blue when the firearm 100 is due to undergo maintenance. According to an embodiment, the LED 9 may include other colors to indicate other corresponding conditions.

According to an embodiment, if the firearm 100 is lost or stolen, it may be tracked or located by remote means utilizing the RMT device 6. In this regard, location tracking may be accomplished by using the GPS/cellular location, retrieved via cellular messaging. The firearm 100 may also employ a global positioning system ("GPS") capability that is embedded into the microcontroller 1 that includes a data transponder to track a physical location of the firearm 100, that stores the information in the memory 21, and that transmits the stored tracking data to a user via the RMT device 6.

According to an embodiment, the capsule injector 10 for permanently disabling the firearm may be an electro-mechanical injection device that contains a capsule that holds and releases a destructive solution rendering the firearm 100 permanently dysfunctional. The capsule injector 10 may be remotely driven such that the firearm 100 is subject to a remote access protocol to remotely destroy the functionality of the firearm 100, as discussed herein. For example, if the firearm 100 is lost or stolen, as an additional or alternative to use of the RMT device 6 to track the firearm, the capsule injector 10 may be remotely instructed to deliver an amount of a destructive solution such as a two-part epoxy or other similar agent contained in a gel-capsule that is capable upon release of producing irreparable damage to one or more mechanical components of the firearm 100. The destructive solution may, for example, employ an agent capable of permanently freezing the hammer 110 of the firearm 100 such that the firearm 100 is rendered incapable of firing. According to an embodiment, the capsule injector 10 may be operably coupled with the I/O board 3 and microcontroller 1 for enabling remote control of the capsule injector 10 via the RMT device 6. According to an embodiment, the capsule injector 10 is a mechanism that comprises a solenoid, that when activated by a command from the authorized user, pushes a pin to permeate a gel-capsule containing the destructive solution, releasing the destructive solution and rendering the firearm inoperable.

According to an embodiment, a menu-driven user interface on at least one of the firearm 100 and the RMT device 6 may permit a user to tailor options regarding functionalities for the firearm 100, wherein functions may be enabled and/or disabled by the user through use of a user-controlled RMT device 6, and an appropriate graphical interface, for example. Among the other things already listed, the RMT is used to change the state, or mode, that the firearm is in such as "Home," "Away," "Ready," "Maintenance," and "Destruct." Such functions may be functions of the microcontroller 1, for example, and may include but not be limited to a multi-tag reading capability, a sensory feedback notification, an internal diagnostics system, and/or additional optional functionalities including GPS tracking, internal tamper sensors, data collection on firearm usages and status, remote destruction of functionality of the firearm 100, and/or a voice biometric override option. The system in the firearm and the RMT each utilize voice biometrics for this purpose and authenticate that the user who is verbalizing the instruction is indeed the authorized user of the firearm. If the system in the firearm or the RMT authenticates the user's voice as the authorized user then the system executes the command that was verbally communicated. The verbal instructions, among other things, are used to change the state, or mode, that the firearm is in such as "Home," "Away," "Ready," "Maintenance," and "Destruct." In this regard, the user may verbally communicate instructions that will override any existing state directly to the firearm or the user can verbally communicate override instructions through the RMT.

According to an embodiment, the multi-tag reading capability may read multiple tags to permit multiple authorizations to enable firing activations and/or to service the firearm 100 and/or perform other such control operations of the firearm 100. An additional level of security may be deployed such that the firearm 100 will only perform a predetermined authorized operation or functionality when in close proximity of a previously identified secondary identification device (such as another RFID tag), wherein close proximity may correspond to a distance in the range of about ±5 feet. The secondary identification device may require an additional battery for an extended range reading.

According to an embodiment, the secondary identification device may be a BTT tag 7, which will work jointly with the primary RFID tag 13. For example, both the RFID tag 13 and the firearm 100 may be taken from an authorized user by an unauthorized person, and the secondary BTT tag 7 may remain with the authorized user (such as by being hidden within the authorized user's clothing). In such an instance, the secondary BTT tag 7 will operate as a secondary authentication device to prevent the RFID tag 13 from authorizing use of the firearm 100 if the BTT tag 7 is not in close proximity to the firearm 100. For example, once the firearm 100 and the RFID tag 13 are with an unauthorized user and are more than 5 feet from the authorized user wearing the BTT tag 7, the unauthorized user will not be able to use or control the firearm 100.

According to an embodiment, sensory feedback may be provided to a user. The sensory feedback notifications may include a haptic, tactile notification such that the firearm 100 provides a touch-based alert, such as a series of vibrations, when responding to an activation of the firearm 100 to alert a firearm user that the firearm 100 firing operation or other functionality has been activated or enabled. A similar alert may occur when the functionality has been disabled. According to an embodiment, the system may utilize a basic vibrator motor similar to that commonly utilized in a cell phone. The vibrator is a purposely unbalanced motor that will cause vibrations instead of a smooth rotation.

Similar alerts may additionally or alternatively include audible alerts (such as using an internal buzzer or horn sound through a speaker to provide audible feedback to a user regarding such activation or other usage), visual alerts (such as use of the LED 9 or other visible color device to provide visual feedback to a user regarding a status of the firearm 100), and/or voice and speech alerts (such as use of internal speakers so the firearm 100 is able to provide audible voice or natural grammar feedback to the user upon such activation or other usage, such as by reading out the name of a user that has been authenticated and authorized to perform one or more operations on the firearm 100). According to an embodiment, the buzzer/horn sound may be transmitted through the system's speaker that is built into the main board 3. In an embodiment, the speaker may be soldered directly to the main board.

According to an embodiment, the system 200 includes an internal diagnostics system. The internal diagnostics system may include coded signals and/or audible alerts for items such as protocol violations, low battery indications, scheduled maintenance indications, and/or one or more component failures of the smart technology system 200. Once paired with the RMT, any protocol violations will results in alerts being sent to the RMT. According to an embodiment, optional functionalities may include GPS tracking location systems, as described above, wherein the firearm 100 may be remotely located using a GPS chip embedded in the firearm 100. If lost, the firearm 100 may be remotely located using a combination of network and GPS-based location services, such as on a remote mobile device. The GPS system may defer to and/or be used in combination with a cellular or network location service when used for indoor tracking such that an approximate location may be obtained even where the GPS system faces obstructions as caused by indoor objects such as walls and that may affect its operations.

According to an embodiment, optional functionalities may include internal electronic and/or mechanical tamper sensors and/or delivery components to support the functionality destruct system (as deployed by the capsule injector 10, for example). In an embodiment, the tamper detection system comprises a contact switch, in the closed position, that is located between the grip and the grip cover. When the grip cover is removed the switch contacts release creating an open circuit. If the system has not been placed in maintenance mode by an authorized user, the system will create an alert indicating that an attempt to tamper with the firearm system is in progress. According to an embodiment, optional functionalities may include collection of data on information such as live fire incidents, the user in possession of the firearm during such incidents, and/or selected environmental data and climate conditions during such incidents. The system uses sensors embedded in the main board and coupled with the system through the GPIO such as accelerometer, voice, picture, NFC, etc. The data may be stored in the firearm 100, such as in the database 22, until the data is accessed and/or cleared remotely.

According to an embodiment, activations of functionalities of the firearm 100 may be reported to one or more trusted destinations in real-time and/or may be retrieved via a WiFi/Cellular network connection to which the firearm 100 is communicatively coupled. The mainboard is a wireless communication enabled device and hence it can communicate with a remote application or device wirelessly. According to an embodiment, a report menu generator may include a system that provides various reports of data through a user interface of the RMT device 6 and/or a user interface associated with the firearm 100. Such data may include, for example, data regarding live fire incidents, history of usage of the firearm 100 by authorized user name, and/or history of usage of the firearm 100 by RFID tag 13 identifications.

According to an embodiment, the firearm 100 may include a voice biometric override system. For example, in emergency conditions, such as if the user has lost control of the firearm, the authorized user may send voice commands to the device to override a default or other functionality. The commands may be linked solely to the authorized user's voice such that only the authorized user's voice will allow for control of the firearm 100. Thus, built-in controls may be subordinate to and overridden by such voice commands (and/or text commands) by the authorized user. The system in the firearm and the RMT each utilize voice biometrics for this purpose and authenticate that the user who is verbalizing the instruction is indeed the authorized user of the firearm. If the system in the firearm or the RMT authenticates the user's voice as the authorized user then the system executes the command that was verbally communicated. The verbal instructions, among other things, are used to change the state, or mode, that the firearm is in such as "Home," "Away," "Ready," "Maintenance," and "Destruct." The user can verbally communicate instructions that will override any existing state directly to the firearm or the user can verbally communicate override instructions through the RMT.

According to an embodiment, optional functionalities may include a sleep mode such that when activity of the firearm 100 ceases for a predetermined period of time, the firearm 100 will activate a low-power mode to reduce battery consumption to a minimum and will wake quickly to return to a higher powered mode when the firearm 100 is activated via remote control as described herein and/or via some type of physical action, such as disconnection form a charger and/or holster. In addition, the GPIO and the active BLE may be stopped while the system is in sleep mode. According to an embodiment, optional functionalities may include a user definable menu to allow the firearm 100 to be programmed for one or more modes of operation, such as wherein the firearm 100 detects and responds to non-routine activities during routine activities so each mode may identify one or more potential problems and react accordingly (such as by alerting an authorized user of the detected problem).

According to an embodiment, for example, a force activate mode may be selected such that a user may place the firearm 100 into a permanent enable status or a status to enable after a predetermined amount of time following a time when the firearm is in a low battery sleep mode such that the firearm is placed in a default, locked mode while charging and returns to an enabled mode after the battery is replaced or recharged as described herein.

It should now be understood that the embodiments herein are directed toward the smart technology system 200 of a firearm 100 that allows for systems and methods of use to monitor and/or control functionalities of the firearm 100. For example, the smart technology system 200 permits enabling and disabling of the firing functionality of the firearm 100, communication to and from the firearm 100 via one or more alerts, messages, and/or actions, remote control administration and potential complete deactivation of the firearm 100, voice biometric security associated with the firearm 100, and additional secondary functionality options through a menu-driven user interface associated with the firearm 100.

Thus, the firearm 100 including the smart technology system 200 may identify persons authorized to use, service, and/or control the firearm 100, may make such functionalities of the firearm 100 accessible to such authorized users, and may permit an authorized user to render the firearm 100 permanently dysfunctional, such as where the firearm 100 is lost and an unauthorized attempt is reported to have been made to gain access to the secure area protected by the cover 11 of the firearm 100 in which embedded components of the smart technology system 200 are contained. The integrated technology driven safety system as implemented and operational through the smart technology system 200 mitigates many risks associated with unauthorized usage and/or misuse of firearms.

Figure 3:
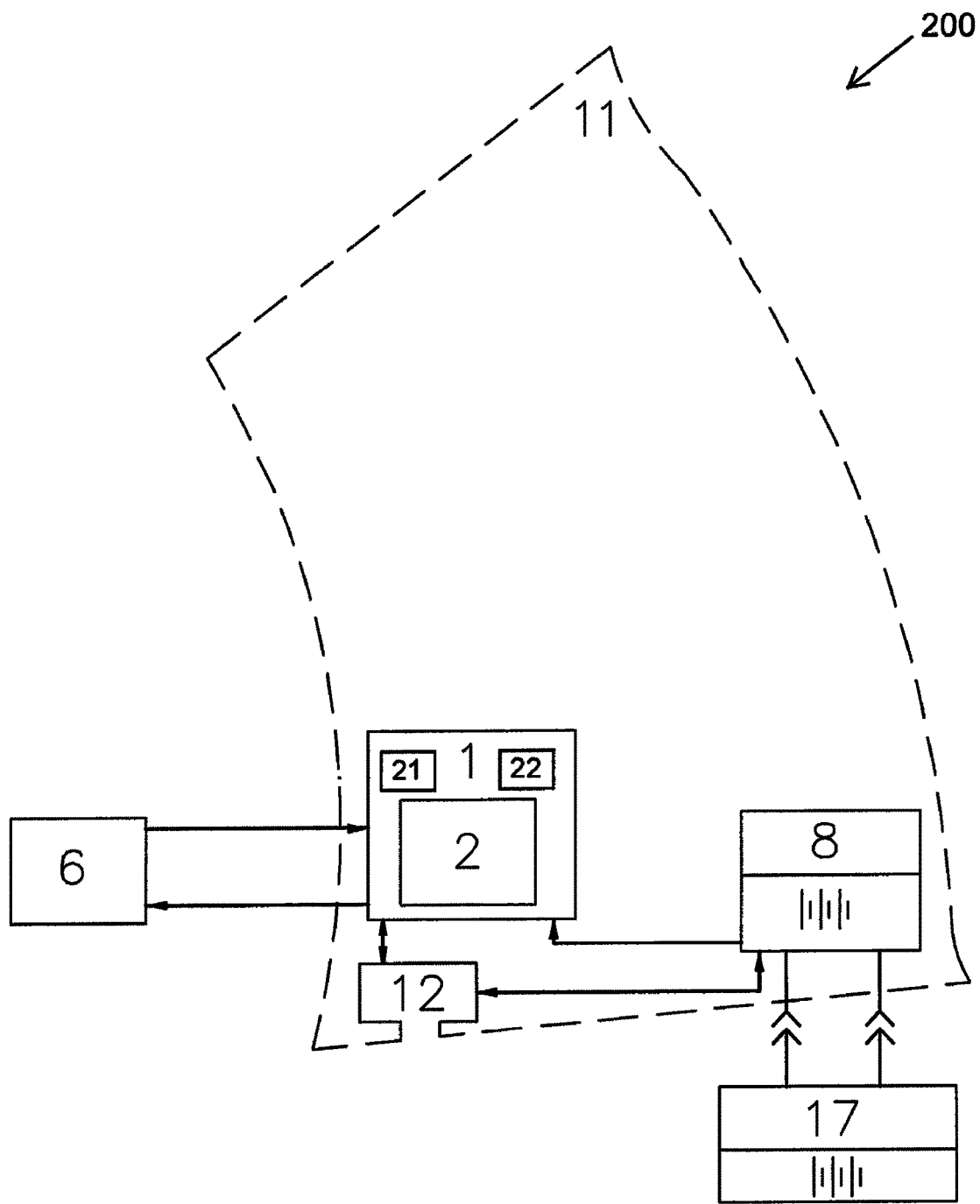
FIG. 3 depicts an exploded view of a grip portion of the exemplary firearm of FIG. 1 and another embodiment of a system for implementing a computer and software based method to monitor and/or control the firearm and its components embedded in the grip portion, according to an embodiment.

Referring to FIG. 3, another embodiment of a smart technology system 200 is illustrated that differs from FIG. 2 in that the I/O board 3 of FIG. 2 and electro-mechanical components interconnected with the I/O board 3 are not present. Such embedded electro-mechanical components that are not present in the embodiment of the smart technology system 200 of FIG. 3 are, for example, the LOCK device 4, the NFC reading device 5, LED 9, the capsule injector 10, the maintenance latching device 14, the power switch 15, the tamper detection switch 16, and the inventory control tag 18. Other non-embedded components that are not in the embodiment of the smart technology system 200 of FIG. 3 are, for example, the BTT tag 7 and the RFID tag 13.

Instead, similar to the smart technology system 200 of FIG. 2, the smart technology system 200 of FIG. 3 may include components described herein with respect to FIG. 2 such as the cover 11, the microcontroller 1, the non-transitory computer-readable memory 21, the database 22 communicatively coupled to the memory 21, and the application 2 to run as a primary service on the microcontroller 1 to control the functionality of the components of the smart technology system 200 of FIG. 3. The smart technology system 200 of FIG. 3 may further include the RMT device 6 to control and/or monitor the firearm 100 through a protocol designed to remotely send and receive messages to and from the microcontroller 1, the MPS 8 and/or auxiliary battery 17 that may provide power to components of the smart technology system 200, and the USB port 12. The embodiment of the smart technology system 200 of FIG. 3 may be used, for example, with mechanical firearms without complex modifications.

Figure 4:
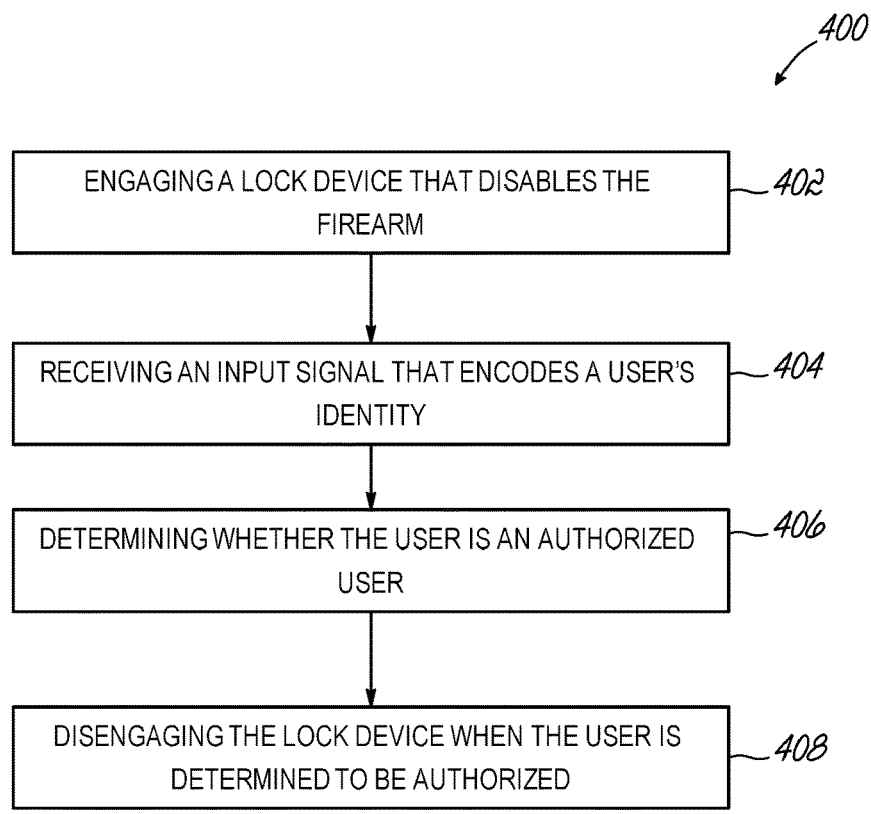
FIG. 4 is a flow chart describing a processor based method of controlling a firearm comprising a smart technology system, according to an embodiment.

FIG. 4 is a flow chart 400 illustrating a processor based method of controlling a firearm comprising a smart technology system, according to an embodiment. In a first stage 402, the method includes engaging, by a processor, a lock device that disables mechanical components of the firearm that are required to discharge or fire the firearm. In a second stage 404, the method includes receiving, by the processor, an input signal from an input/output device, the signal encoding information regarding the identity of a user attempting to use the firearm. In a further stage 406, the method includes determining from the input signal whether the user is an authorized user. In a further stage 408, when the user is determined to be an authorized user, the method includes disengaging the lock device to enable the mechanical components of the firearm that are required to discharge or fire the firearm.

Figure 5:
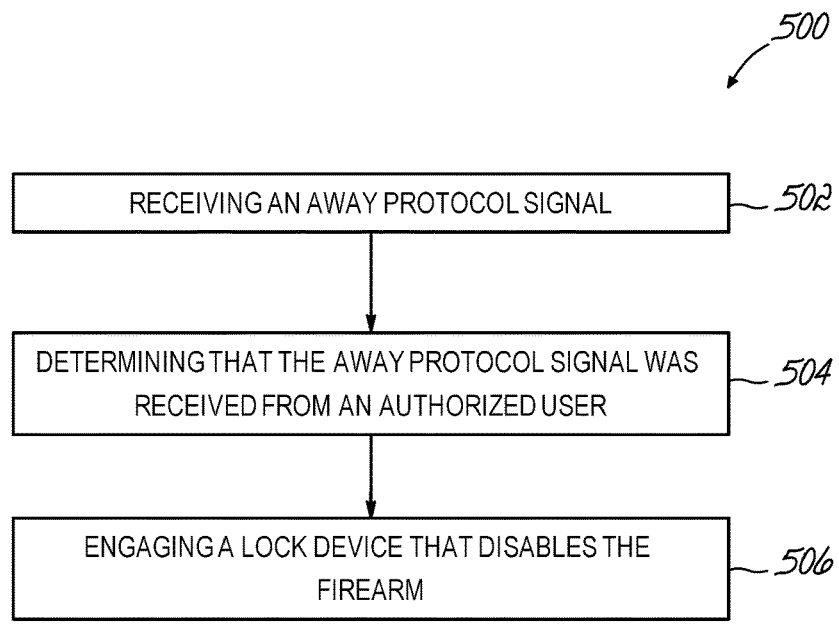
FIG. 5 is a flow chart illustrating an "away protocol" for controlling a firearm comprising a smart technology system, according to an embodiment.

FIG. 5 is a flow chart 500 illustrating an "away protocol" for controlling a firearm comprising a smart technology system, according to an embodiment. The "away protocol" provides functionality for an authorized user to place the firearm in a disabled state for an extended period of time. For example, an authorized user may wish to leave the firearm at home and have the firearm disabled so that no one else in the house can use the firearm during the time of the authorized user's absence. According to an embodiment, an authorized user may issue a command that initiates the "away protocol." An authorized user may initiate the "away protocol" command using an external device. For example, a user may issue the command using a smart cellular telephone or other external device. According to an embodiment, the "away protocol" command may be issued by an authorized user who enters a voice-based or text based command to the external device. The external device may then generate a signal that is communicated to the firearm.

According to an embodiment, at stage 502, the firearm may receive a signal from the external device indicating that the "away protocol" has been issued. The signal may be received by the firearm through a wired or wireless connection. In stage 504, the microcontroller 1 may determine that the "away protocol" was received by an authorized user. Upon determining that the "away protocol" signal was received from an authorized user, in stage 506, the microcontroller may engage a lock device that disables the firearm. In a further embodiment, the "away protocol" may be issued directly to the firearm using a voice command that is received by a biometric device. According to an embodiment, the biometric device may be configured to perform voice recognition to determine that an "away protocol" command has been received by an authorized user. The biometric device may then generate the "away protocol" signal in response to receiving the voice command from the authorized user. As described above, the application that runs in the RMT as well as the application that runs in the firearm both have the capability to receive and act on voice instructions verbalized by an authorized user. The system in the firearm and the RMT each utilize voice biometrics for this purpose and authenticates that the user who is verbalizing the instruction is indeed the authorized user of the firearm. If the system in the firearm or the RMT authenticates the user's voice as the authorized user then the system executes the command that was verbally communicated.

Figure 6:
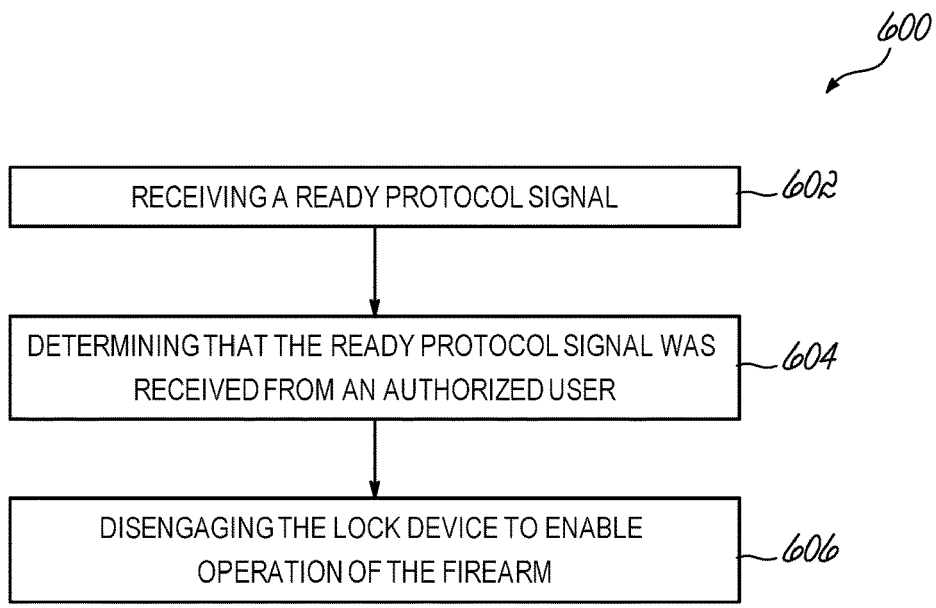
FIG. 6 is a flow chart illustrating a "ready protocol" for controlling a firearm comprising a smart technology system, according to an embodiment.

FIG. 6 is a flow chart 600 illustrating a "ready protocol" for controlling a firearm comprising a smart technology system, according to an embodiment. According to an embodiment, in a sense, the "ready protocol" may be thought of as the opposite of the "away protocol." In this regard, when the "ready protocol" is issued, the firearm may be placed in an enabled state. As with the "away protocol" discussed above, the "ready protocol" may be initiated by a voice or text command that is issued by an authorized user. For example, the "ready protocol" command may be issued by an authorized user who enters a voice-based or text based command to an external device. In a further embodiment, the "ready protocol" may be initiated when an authorized user issues the "ready protocol" directly to the firearm using a voice command that is received by the biometric device that performs voice recognition to determine that a "ready protocol" command has been received by an authorized user.

According to an embodiment, at stage 602, the firearm may receive a signal from a remote device indicating that the "ready protocol" as been issued. The signal may be received by the firearm through a wired or wireless connection. In stage 604, the microcontroller 1 may determine that the "ready protocol" was received by an authorized user. Upon determining that the "ready protocol" signal was received from an authorized user, in stage 606, the microcontroller may disengage the lock device so as to enable operation of the firearm. In a further embodiment, the "ready protocol" may be issued directly to the firearm using a voice command that is received by a biometric device that is configured to perform voice recognition to determine that a "ready protocol" command has been received by an authorized user. The biometric device may then generate the "ready protocol" signal in response to receiving the voice command from the authorized user.

According to further embodiments, other protocols may be provided. For example, a "forced enable protocol" may provide functionality to allow an authorized user to place the firearm in a "forced enable" mode. In this regard, while in the "forced enable" mode, the firearm may only be operated when an RFID signal is received indicating the proximity of an authorized user, as described in further detail below.

Figure 7:
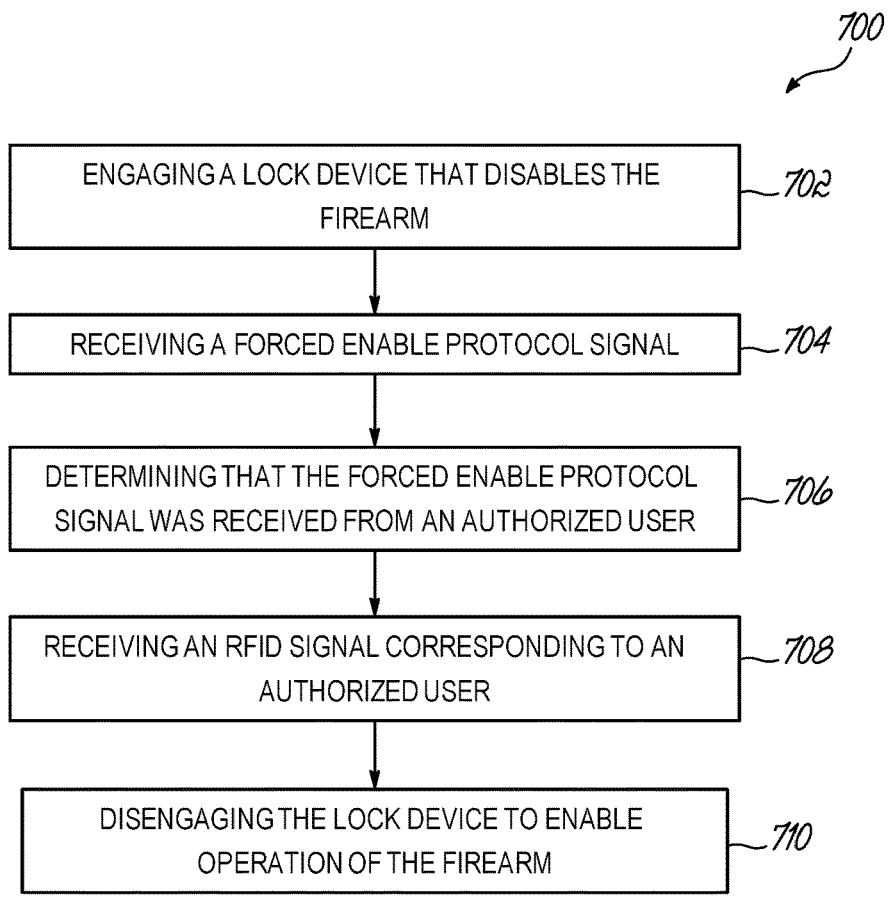
FIG. 7 is a flow chart illustrating a "forced enable protocol" for controlling a firearm comprising a smart technology system, according to an embodiment.

FIG. 7 is a flow chart 700 illustrating a "forced enable protocol" for controlling a firearm comprising a smart technology system, according to an embodiment. In stage 702, the method includes engaging a lock device that disables mechanical components of the firearm that are required to discharge or fire the firearm. In a second stage 704, the method includes receiving an input signal from an input/output device, the signal encoding a "forced enable" signal. In a further stage 706, the method includes determining from the input signal that the user is an authorized user. In stage 708 an RFID signal is received and determined to be associated with an authorized user. In stage 710, when the user is determined to be an authorized user, the method includes disengaging the lock device to enable the mechanical components of the firearm that are required to discharge or fire the firearm.

According to a further embodiment, a "forced disable protocol" may be provided. In this regard, the "forced disable protocol" is similar to the "away protocol," described above and illustrated in FIG. 5, with the additional feature that the firearm may not be enabled using an RFID tag, even from an authorized user.

Figure 8:
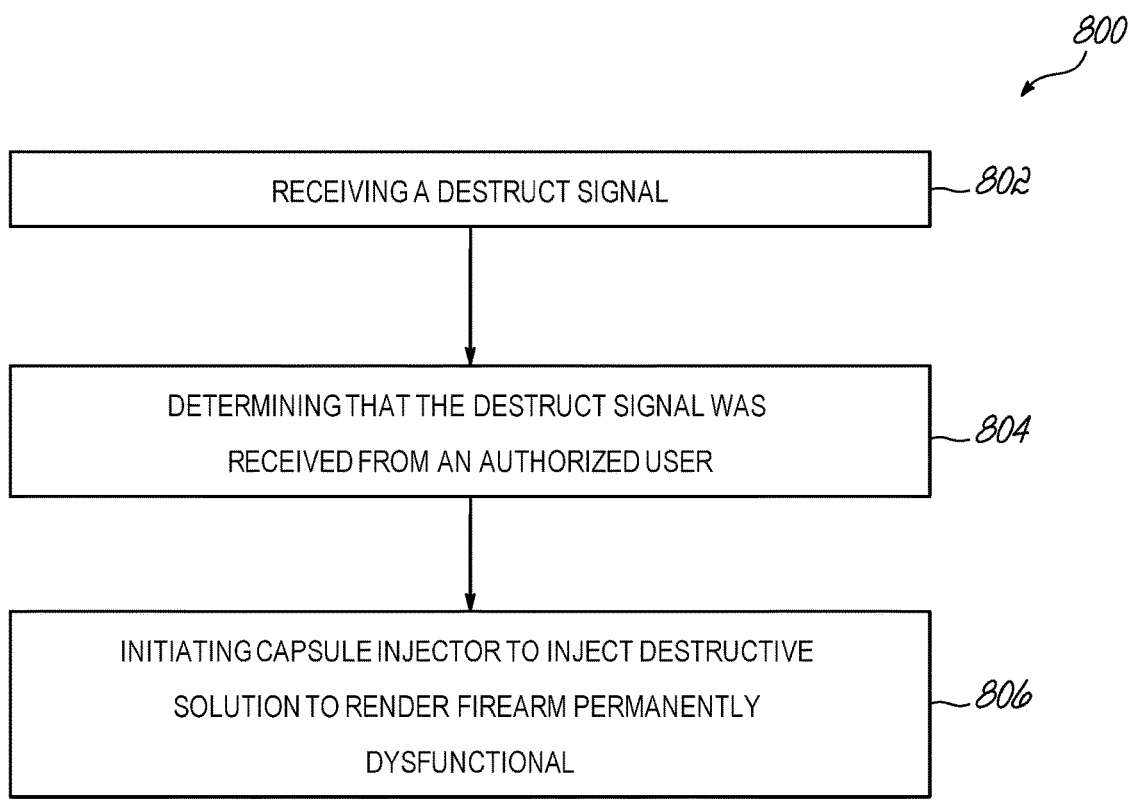
FIG. 8 is a flow chart illustrating a "destruct protocol" for controlling a firearm comprising a smart technology system, according to an embodiment.

FIG. 8 is a flow chart 800 illustrating a "destruct protocol" for controlling a firearm comprising a smart technology system, according to an embodiment. The "destruct protocol" provides a capability whereby the firearm may be rendered permanently dysfunctional in response to an authorized user issuing a "destruct" signal. The functionality provided by the "destruct protocol" may be advantageous in the event that the firearm becomes lost or stolen. In this regard, an authorized user may issue a "destruct" command as a voice or text based command to a mobile device. In a further embodiment, the "destruct protocol" may be initiated when an authorized user issues a "destruct" command directly to the firearm using a voice command that is received by the biometric device that performs voice recognition to determine that n "destruct" command has been received by an authorized user.

According to an embodiment, at stage 802, the firearm may receive a signal from the external device indicating that the "away protocol" has been issued. The signal may be received by the firearm through a wired or wireless connection. In stage 804, the microcontroller 1 may determine that the "destruct protocol" signal was received by an authorized user. Upon determining that the "destruct protocol" signal was received from an authorized user, in stage 806, the microcontroller 1 may activate the capsule injector 10 to release a destructive solution rendering the firearm 100 permanently dysfunctional. In a further embodiment, the "destruct protocol" may be issued directly to the firearm using a voice command that is received by a biometric device that performs voice recognition to determine that a "destruct protocol" command has been received by an authorized user. The biometric device may then generate the "destruct protocol" signal in response to receiving the voice command from the authorized user.

According to an embodiment, the destructive solution may include a two-part epoxy or other similar agent contained in a gel-capsule that, upon release, is capable of producing irreparable damage to one or more mechanical components of the firearm 100. The destructive solution may, for example, employ an agent capable of permanently freezing the hammer 110 of the firearm 100 such that the firearm 100 is rendered incapable of firing.

Figure 9:
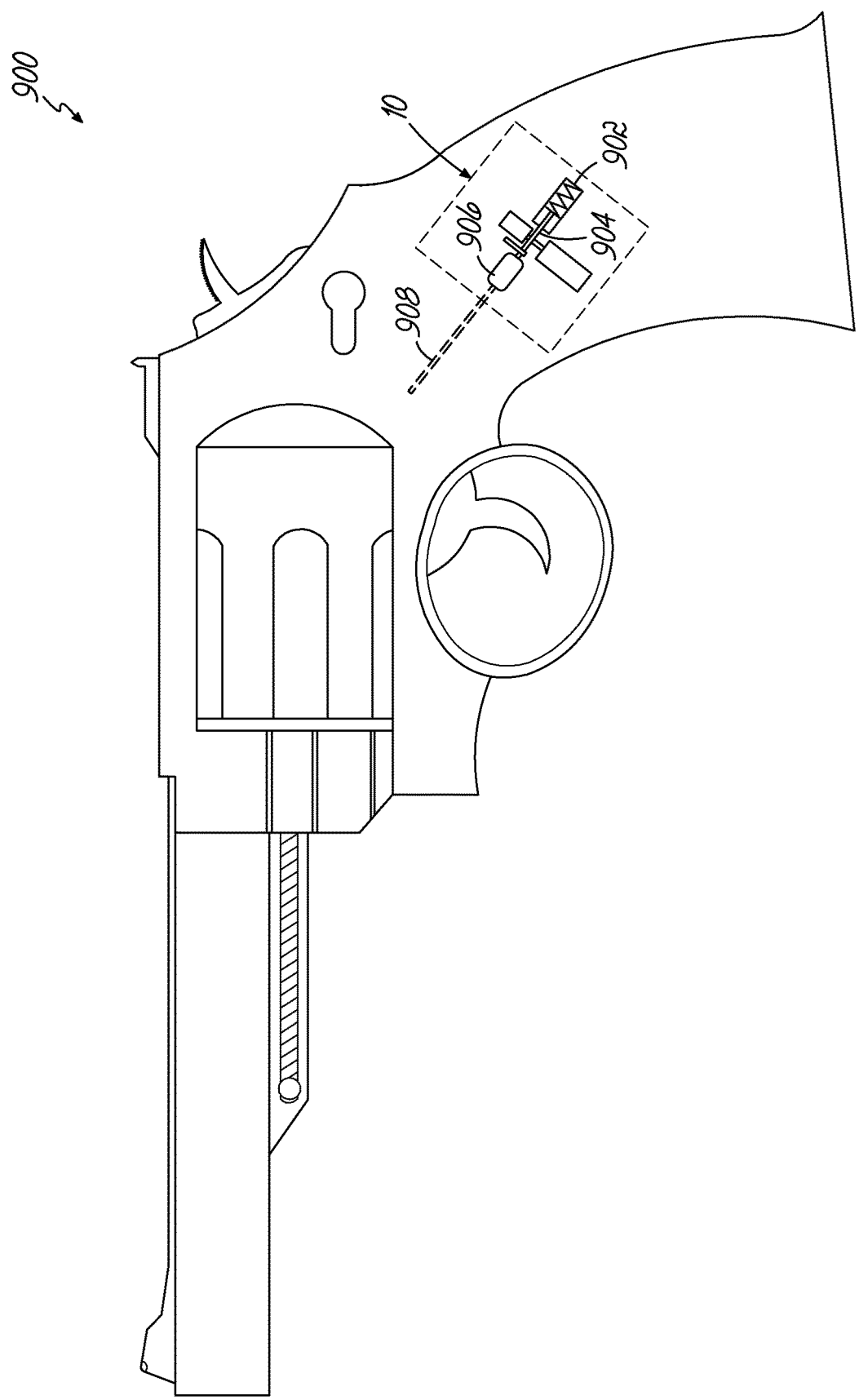
FIG. 9 is a schematic illustration of the capsule injector, according to an embodiment.

FIG. 9 is a schematic illustration 900 of the capsule injector 10, according to an embodiment. The capsule injector 10 is a mechanism that comprises a solenoid 902, that when activated by a command from the authorized user, pushes a pin 904 to permeate the gel-capsule 906 containing the destructive solution, releasing the destructive solution into a channel 908 and rendering the firearm inoperable. The capsule injector mechanism is connected to the rest of the system via the I/O Board.

Figure 10:
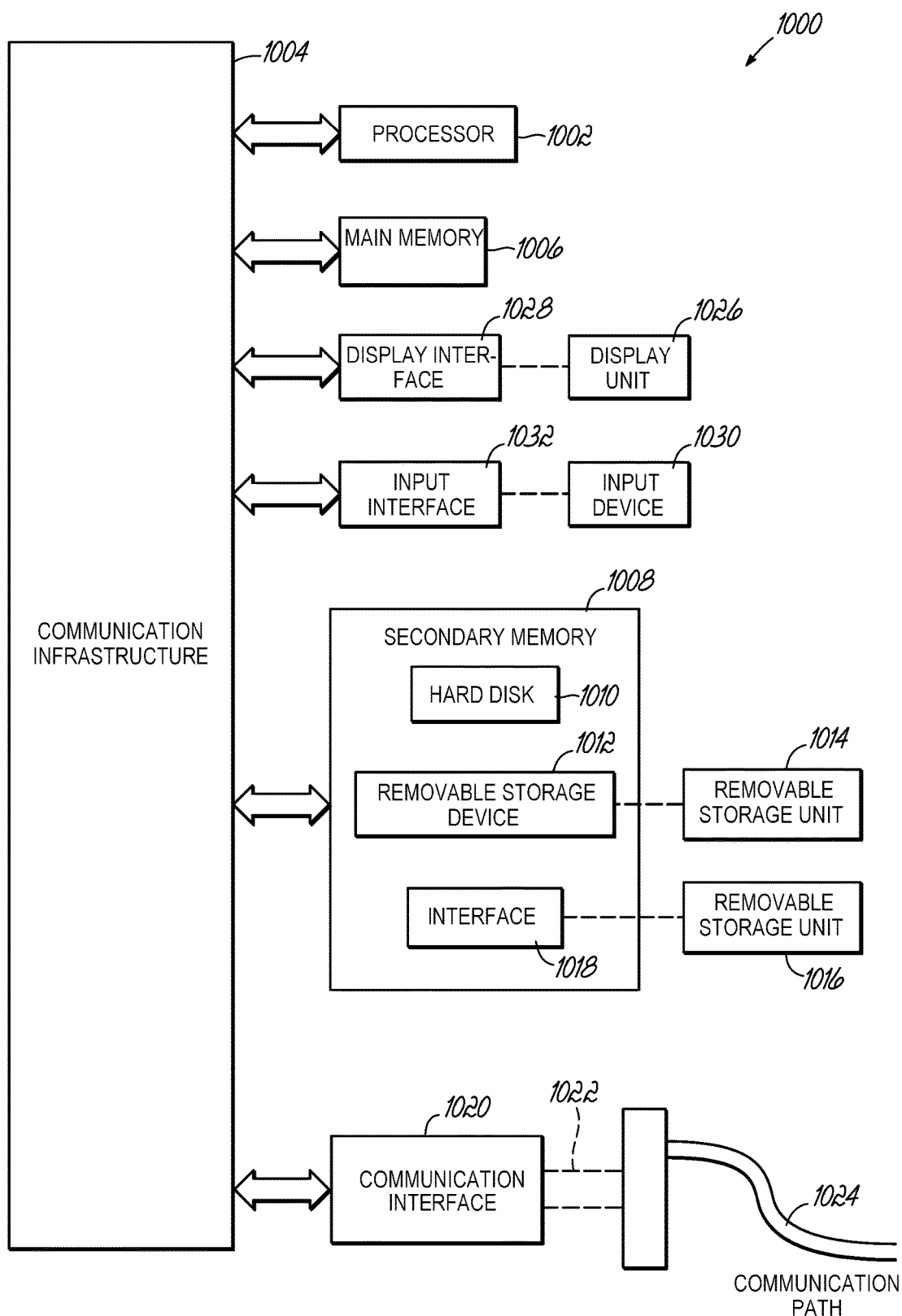
FIG. 10 is a block diagram of an example computer system in which embodiments of the disclosed invention, or portions thereof, may be implemented.

FIG. 10 is a block diagram of an example computer system 1000 in which embodiments of the disclosed invention, or portions thereof, may be implemented. That is, system 200 may use one or more components as noted and illustrated which operate under control of computer-readable code, which is executed by one or more processors causing the one or more processors to perform operations of the disclosed invention, according to an embodiment.

For example, system 100 (see FIG. 1) may be implemented on computer system 1000 using hardware, software, firmware, tangible computer readable media having instructions stored thereon, or a combination thereof and may be implemented in one or more computer systems or other processing system.

If programmable logic is used, such logic may be executed on a commercially available processing platform or a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various embodiments of the invention are described in terms of this example computer system 1000. After reading this description, it will become apparent to persons of ordinary skill in the relevant art how to implement the invention using other computer systems and/or computer architectures. Although operations may be described as a sequential process, some of the operations may in fact be performed in parallel, concurrently, and/or in a distributed environment, and with program code stored locally or remotely for access by single or multiprocessor machines. In addition, in some embodiments the order of operations may be rearranged without departing from the spirit of the disclosed subject matter.

As will be appreciated by persons of ordinary skill in the relevant art, a computing device for implementing the disclosed invention has at least one processor, such as processor 1002, wherein the processor may be a single processor, a plurality of processors, a processor in a multi-core/multiprocessor system, such system operating alone, or in a cluster of computing devices operating in a cluster or server farm. Processor 1002 may be connected to a communication infrastructure 1004, for example, a bus, message queue, network, or multi-core message-passing scheme.

Computer system 1000 may also include a main memory 1006, for example, random access memory (RAM), and may also include a secondary memory 1008. Secondary memory 1008 may include, for example, a hard disk drive 1010, removable storage drive 1012. Removable storage drive 1012 may include a floppy disk drive, a magnetic tape drive, an optical disk drive, a flash memory, or the like. The removable storage drive 1012 may be configured to read and/or write data to a removable storage unit 1014 in a well-known manner. Removable storage unit 1014 may include a floppy disk, magnetic tape, optical disk, etc., which is read by and written to, by removable storage drive 1012. As will be appreciated by persons of ordinary skill in the relevant art, removable storage unit 1014 may include a computer readable storage medium having computer software (i.e., computer program instructions) and/or data stored thereon.

In alternative implementations, secondary memory 1008 may include other similar devices for allowing computer programs or other instructions to be loaded into computer system 1000. Such devices may include, for example, a removable storage unit 1016 and an interface 1018. Examples of such devices may include a program cartridge and cartridge interface (such as that found in video game devices), a removable memory chip (such as EPROM or PROM) and associated socket, and other removable storage units 1016 and interfaces 1018 which allow software and data to be transferred from the removable storage unit 1016 to computer system 1000.

Computer system 1000 may also include a communications interface 1020. Communications interface 1020 allows software and data to be transferred between computer system 1000 and external devices. Communications interfaces 1020 may include a modem, a network interface (such as an Ethernet card), a communications port, a PCMCIA slot and card, or the like. Software and data transferred via communications interface 1020 may be in the form of signals 1022, which may be electronic, electromagnetic, optical, or other signals capable of being received by communications interface 1020. These signals may be provided to communications interface 1020 via a communications path 1024.

In this document, the terms "computer program storage medium" and "computer usable storage medium" are used to generally refer to storage media such as removable storage unit 514, removable storage unit 1016, and a hard disk installed in hard disk drive 1010. Computer program storage medium and computer usable storage medium may also refer to memories, such as main memory 1006 and secondary memory 1008, which may be semiconductor memories (e.g., DRAMS, etc.). Computer system 1000 may further include a display unit 1026 that interacts with communication infrastructure 1004 via a display interface 1028. Computer system 1000 may further include a user input device 1030 that interacts with communication infrastructure 1004 via an input interface 1032. A user input device 1030 may include a mouse, trackball, touch screen, or the like.

Computer programs (also called computer control logic or computer program instructions) are stored in main memory 1006 and/or secondary memory 1008. Computer programs may also be received via communications interface 1020. Such computer programs, when executed, enable computer system 1000 to implement embodiments as discussed herein. In particular, the computer programs, when executed, enable processor 1002 to implement the processes of embodiments of the invention, such as the stages in the method illustrated by flowchart 400 of FIG. 4, discussed above. Accordingly, such computer programs represent controllers of the computer system 1000. When an embodiment is implemented using software, the software may be stored in a computer program product and loaded into computer system 1000 using removable storage drive 1012, interface 1018, and hard disk drive 1010, or communications interface 1020.

Embodiments may be implemented using software, hardware, and/or operating system implementations other than those described herein. Any software, hardware, and operating system implementations suitable for performing the functions described herein can be utilized. Embodiments are applicable to both a client and to a server or a combination of both It is also noted that recitations herein of "at least one" component, element, etc., should not be used to create an inference that the alternative use of the articles "a" or "an" should be limited to a single component, element, etc.

It is noted that recitations herein of a component being "programmed" in a particular way, "configured" or "programmed" to embody a particular property, or function in a particular manner, are structural recitations, as opposed to recitations of intended use. More specifically, the references herein to the manner in which a component is "programmed" or "configured" denotes an existing physical condition of the component and, as such, is to be taken as a definite recitation of the structural characteristics of the component.

For the purposes of describing and defining the invention, it is noted that the terms "substantially" and "approximately" and "about" are utilized herein to represent the inherent degree of uncertainty that may be attributed to any quantitative comparison, value measurement, or other representation. The terms "substantially" and "approximately" are also utilized herein to represent the degree by which a quantitative representation may vary from a stated reference without resulting in a change in the basic function of the subject matter at issue.

Having described the subject matter of the invention in detail and by reference to specific embodiments thereof, it is noted that the various details disclosed herein should not be taken to imply that these details relate to elements that are essential components of the various embodiments described herein, even in cases where a particular element is illustrated in each of the drawings that accompany this disclosure. Further, it will be apparent that modifications and variations are possible without departing from the scope of the invention, including, but not limited to, embodiments defined in the appended claims. More specifically, although some aspects of the invention are identified herein as preferred or particularly advantageous, it is contemplated that the invention is not necessarily limited to these aspects. Although various aspects of the claimed subject matter have been described herein, such aspects need not be utilized in combination. It is therefore intended that the appended claims cover all such changes and modifications that are within the scope of the claimed subject matter.

What is claimed is:

1. A firearm comprising a smart technology system that controls one or more firearm functionalities, the smart technology system comprising:
    one or more input/output (I/O) devices;
    a lock device that disables a component of the firearm required to discharge the firearm while in an engaged state, and enables the component of the firearm while in a disengaged state;
    a cover that encloses at least one component of the smart technology system;

a tamper detection device that detects when the cover is open;

a processor; and a non-transitory computer readable storage medium having computer program instructions stored thereon that, when executed by the processor, causes the system to:
engage the lock device;
receive an input signal from an I/O device, the input signal encoding information regarding the identity of a user;
determine from the input signal whether the user is an authorized user;
disengage the lock device, enter a maintenance mode, or disengage the lock device and enter the maintenance mode when the user is determined to be an authorized user; and
in response to the tamper detection device detecting the cover is open while the system is not in the maintenance mode, transmit an alert to a remote device indicating an attempt to tamper with the system.

2. The firearm of claim 1, wherein the remote device monitors the firearm through a protocol that remotely sends and receives messages to and from an external network or device.

3. The firearm of claim 1, further comprising a universal serial bus (USB) port that is configured to upload and download data to and from an external network or device.

4. The firearm of claim 1, further comprising a battery and a first wireless battery charging device that charges the battery when the first wireless battery charging device communicates with a corresponding external second wireless battery charging device.

5. The firearm of claim 1, further comprising:
a first camera pointing in a forward direction that captures images of objects in a direction in which the firearm is pointed; and
a second camera pointing in a backward direction that captures images of a person holding the firearm.

6. The firearm of claim 1, further comprising:
a laser sight that assists the user in aiming the firearm at an intended target,
wherein the laser sight is configured to be activated only when the user is determined to be the authorized user.

7. The firearm of claim 1, further comprising:
a tag reader that reads one or more of a near-field communication (NFC) tag, a radio frequency identification (RFID) tag, or Bluetooth Technology (BTT) tag, and thereby receives the identification input signal that encodes information regarding the identity of the user attempting to use the firearm.

8. The firearm of claim 7, wherein a unique tag identifies one or more authorized users, the identification being determined by comparing information read from the unique tag and comparing the read information with corresponding information stored on the non-transitory computer readable storage medium.

9. The firearm of claim 1, further comprising:
a maintenance latching device configured to keep the cover in a closed and locked configuration by default and unlock the cover when the system is in the maintenance mode.

10. The firearm of claim 9, wherein the maintenance latching device comprises an electro-mechanical latch that is activated by one or more of a remote protocol command received from a remote control and monitoring device, or a signal from a tag reader that receives the identification input signal from an NFC tag, an RFID tag, or a BTT tag.

11. The firearm of claim 1, further comprising a remote tracking device that comprises a data transponder that tracks a physical location of the firearm and transmits physical location data to an external network or device.

12. The firearm of claim 1, further comprising a destruction device that is configured to be remotely activated to render the firearm permanently dysfunctional.

13. The firearm of claim 1, further comprising a user interface configured to permit a user to tailor options regarding functionalities for the firearm, the functionalities comprising one or more of a multi-tag reading capability, a sensory feedback notification capability, an internal diagnostics capability, a global positioning system (GPS) tracking capability, an internal tamper detection capability, a data collection on firearm usages and status capability, a remote destruction of firearm functionality, and a voice biometric override option.

14. The firearm of claim 1, wherein the smart technology system is configured to enable the mechanical components of the firearm require to discharge the firearm, only when two or more separate input signals are received and the authorized user is determined based on the two or more separate input signals.

15. The firearm of claim 1, further comprising a notification device that provides one or more alerts indicating a status of the firearm, wherein the alerts comprise one or more of haptic, tactile, audible, and visual alerts.

16. The firearm of claim 1, further comprising a voice biometric device configured to:
receive a voice command;
determined that the received voice command was issued by an authorized user; and
cause the smart technology system to override a default functionality or other functionality of the firearm in response to the received command.

17. The firearm of claim 1, wherein the smart technology system is configured to comprise a sleep mode that activates a low-power operation state that reduces battery consumption of the firearm when activity of the firearm ceases for a predetermined time.

18. The firearm of claim 1, wherein the smart technology system is configured to comprise a force activate mode that allows a user to select a state in which the firearm is placed in a permanent enabled state or a temporary enabled state in which the firearm becomes disabled after a predetermined period of time.

19. The firearm of claim 1, wherein the smart technology system is configured to comprise a force activate mode that:
places the firearm in a default locked mode while a battery of the firearm is in a low charge state; and
returns the firearm to an enabled/unlocked mode after the battery has been recharged or replaced.

* * * * *

UNITED STATES PATENT AND TRADEMARK OFFICE
CERTIFICATE OF CORRECTION

| | | |
|---|---|---|
| PATENT NO. | : 10,365,057 B2 | Page 1 of 1 |
| APPLICATION NO. | : 15/206576 | |
| DATED | : July 30, 2019 | |
| INVENTOR(S) | : Black et al. | |

It is certified that error appears in the above-identified patent and that said Letters Patent is hereby corrected as shown below:

In the Claims

Column 20, Line 25-26 Claim 14 reads:
"... system is configured to enable the mechanical components of the firearm require to discharge the firearm, only when ..."
But should be:
"... system is configured to enable the mechanical components of the firearm required to discharge the firearm, only when ..."

Column 20, Line 37 Claim 16 reads:
"... determined that the received voice command was issued ..."
But should be:
"... determine that the received voice command was issued ..."

Signed and Sealed this
Twenty-ninth Day of October, 2019

Andrei Iancu
*Director of the United States Patent and Trademark Office*